US008731038B2

(12) United States Patent
Pean et al.

(10) Patent No.: US 8,731,038 B2
(45) Date of Patent: May 20, 2014

(54) METHOD AND APPARATUS FOR DETERMINING CHANNEL STATE INFORMATION

(75) Inventors: Johan Pean, Dresden (DE); Andreas Bury, Dresden (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 97 days.

(21) Appl. No.: 13/543,997

(22) Filed: Jul. 9, 2012

(65) Prior Publication Data

US 2013/0016767 A1   Jan. 17, 2013

(30) Foreign Application Priority Data

Jul. 13, 2011 (EP) ................................ 11173714

(51) Int. Cl.
*H03H 7/30* (2006.01)
(52) U.S. Cl.
USPC ........... 375/232; 375/285; 375/267; 375/260; 375/259; 370/210; 370/328
(58) Field of Classification Search
USPC .......... 375/232, 260, 285, 267, 259; 370/210, 370/328
See application file for complete search history.

(56) References Cited

U.S. PATENT DOCUMENTS

| 8,467,467 B2 * | 6/2013 | Lee et al. ................ 375/267 |
| 2007/0071147 A1 | 3/2007 | Sampath et al. | |
| 2009/0274074 A1 | 11/2009 | Astely | |
| 2010/0190486 A1 * | 7/2010 | Kimura et al. ............... 455/423 |
| 2011/0007834 A1 * | 1/2011 | Hoshino et al. ............. 375/285 |
| 2011/0096852 A1 * | 4/2011 | Kimura et al. .............. 375/259 |
| 2012/0051287 A1 * | 3/2012 | Merlin et al. ............... 370/328 |
| 2012/0093253 A1 * | 4/2012 | Park et al. ................... 375/285 |
| 2012/0315051 A1 * | 12/2012 | Oomori et al. .............. 398/135 |

FOREIGN PATENT DOCUMENTS

| WO | 2009023681 A2 | 2/2009 |
| WO | 2010106549 A2 | 9/2010 |

OTHER PUBLICATIONS

Zijian Bai, et al., "Dynamic Transmission Mode Selection in LTE/LTE-Advanced System", 2010 3rd International Symposium on Applied Sciences in Biomedical and Communication Technologies, Nov. 1, 2010, pp. 1-5.

* cited by examiner

*Primary Examiner* — Eva Puente
(74) *Attorney, Agent, or Firm* — Eschweiler & Associates, LLC

(57) ABSTRACT

A mobile station receiving a signal from a base station experiences time/frequency varying channel conditions. In order to get the maximum throughput from a base-station, it is necessary to adjust the modulation and coding schemes to the actual channel quality. To do so, mobile receivers are required to probe the radio channel condition and feedback a limited set of estimated channel state information parameters such as CQI, RI, and PMI. The invention uses modulation-specific mutual information as a basic metric for CQI-PMI-RI computation to yield high bandwidth efficiency under both flat fading and interference conditions as well as time and frequency selective fading and interference conditions, at reasonable complexity.

13 Claims, 5 Drawing Sheets

METHOD AND APPARATUS FOR DETERMINING CHANNEL STATE INFORMATION

REFERENCE TO RELATED APPLICATIONS

This application claims priority to European Patent Application No. 11173714.4, filed on Jul. 13, 2011, the content of which are being incorporated by reference in its entirety.

FIELD

The invention relates to a method for determining channel state information. More particularly, the invention relates to a method for deriving channel state information in an OFDM baseband receiver. The invention also relates to an apparatus that performs the method of deriving channel state information.

BACKGROUND

Orthogonal frequency division multiplexing (OFDM) has been widely adopted for a variety of wireless communication standards, such as WLAN IEEE 802.11 a/g, DAB, TDMB, DVB-T, WiMax, and also 3GPP LTE. Due to its potential for low complexity receiver implementation, OFDM is particularly attractive for high-data rate transmission.

In OFDM, the transmission bandwidth is split into equidistantly spaced orthogonal sub-bands of identical width. Orthogonality is maintained under the prerequisite that the duration of the channel impulse response does not exceed the duration of the guard interval, and that the radio propagation channel conditions vary slowly enough. Both requirements are satisfied by proper selection of system parameters, such as sub-carrier spacing and guard interval duration. Then transmission of one data symbol is described by the simple equation $$y_{k,l} = h_{k,l} x_{k,l} + n_{k,l} \quad (1),$$

wherein x is a transmitted symbol, h is a complex fading coefficient, n is a random noise sample, y is the corresponding received symbol, k is the OFDM subcarrier index, and l is the OFDM symbol index. The noise sample is characterized by the noise variance $\sigma_n^2$. With different values for all different pairs of (k,l), this equation holds for all symbols in the time-frequency plane, as illustrated in FIG. 1.

An extension to OFDM with one TX antenna is multiple-input multiple-output (MIMO) OFDM, where multiple antennas are used both on the transmit side and the receive side. In this case, each element in the time-frequency plane corresponds to the equation $$y_{k,l} = H_{k,l} x_{k,l} + n_{k,l}, \quad (2)$$

where x is a vector of transmitted symbol, H is a matrix of complex fading coefficients, n is a random noise sample vector, y is the corresponding received symbol vector. The random noise vector is characterized by its covariance matrix $\Phi_{nn}$.

In LTE each element in the time-frequency plane is referred to as a resource element, and the entire time-frequency plane is divided into so-called resource blocks, which are rectangles of 12 subcarriers in frequency direction times 6 or 7 (depending on the cyclic prefix duration mode) OFDM symbols in time direction, as illustrated in FIG. 2.

LTE supports a number of link adaptation methods, in order to provide a certain desired quality of service to mobile users. The modulation and coding scheme, i.e., the modulation alphabet and the coding rate are adapted to given link conditions, in order to meet a targeted maximum packet error rate.

A mobile station receiving a signal from a base station experiences time/frequency varying channel conditions. In order to get the maximum throughput from a base-station, it is necessary to adjust the modulation and coding schemes (QPSK, 16-QAM, or 64-QAM) to the actual channel quality. To do so, mobile receivers are required to probe radio channel conditions and to feed back a limited set of estimated parameters, namely a channel quality indicator (CQI) that reflects the achievable spectral efficiency, and a channel rank indication (RI) and a precoding matrix index (PMI) both of which are needed to achieve that spectral efficiency.

To meet a target maximum packet error rate, the mobile station sends a proposal for the choice of the modulation and coding scheme to the base station (channel quality indication—CQI). In addition, there is a MIMO transmission mode utilizing implicit beamforming via precoding, which allows improved utilization of the spatial channel dimension. In this mode, the mobile station sends a proposal for the number of transmission layers (rank indication—RI) and best precoding matrix (precoding matrix index—PMI). The mobile station obtains all this feedback information based on an assessment of the channel conditions and sends its proposals to the base station. Conventionally, all this channel state information (CSI) is computed based on the signal-to-interference plus noise ratio (SINR) which would be obtained after equalization.

The SINR is then used to compute the unbound channel capacity:

$$C_{k,l} = \log 2(1 + SINR_{k,l}) \quad (3)$$

The basic conventional approach is summarized in the following steps:

Post-equalization SINR or capacity is directly mapped to CQI using a pre-defined mapping function or table which would typically be derived using Monte-Carlo simulation. Channel capacity or briefly 'capacity' is used as a metric for RI computation. The rank offering highest capacity is selected. Among all possible PMI values, the PMI is selected that maximizes post-equalization SINR or capacity. Channel capacity, or brief 'capacity', is generally understood in the art as the maximum amount of information, or messages, that can be communicated over a channel.

As LTE network operators are interested in a most efficient utilization of the valuable and costly resource 'bandwidth', there is a demand to operate the radio network at the highest possible bandwidth utilization. As a prerequisite to achieve high bandwidth efficiency, a mobile station, or user equipment (UE) in LTE terminology, must report accurate channel state information to the base station, or enhanced NodeB (eNB) in LTE terminology.

However, conventional methods for channel state information computation suffer from inaccuracy, which results in sub-optimum bandwidth efficiency. In particular when considering a large set of varying application scenarios that will exist under conditions of time and frequency selective fading and interference, the overall average bandwidth efficiency that is presently achieved is clearly lower than possible.

What is needed in the art, therefore, is a way to yield high bandwidth efficiency under both flat fading and interference conditions as well as time and frequency selective fading and interference conditions, at lower computational complexity which directly translates into lower cost, in terms of die area as well as power consumption.

SUMMARY

According to the invention there is provided a method for determining channel state information in an orthogonal frequency division multiplexing (OFDM) transmission scheme. The method comprises estimating a frequency selective interference noise covariance matrix per resource block, obtaining a normalized channel matrix by weighting the channel matrix using the interference estimate, and determining a channel equivalent matrix by multiplying the normalized channel matrix with all available precoding matrices. The method further comprises computing a post-equalization signal-to-interference plus noise ratio (SINR) as a function of the equalizer in use, deriving mutual information for each post-equalization SINR as a function of the modulation used, averaging the mutual information in sub-bands, and deriving channel state information from the averaged mutual information. In particular, deriving mutual information may comprise computing a hypothetical capacity for all input post-equalization SINR, and applying a non-linear transform to the hypothetical capacity, which non-linear transform models the actual modulation type and the receiver specific QAM demapper implementation, to obtain the mutual information for each post-equalization SINR value.

The step of deriving channel state information from the averaged mutual information may comprise selecting a precoding matrix index (PMI) for each possible number of code words such that it maximizes the sum of spectral efficiency over all code words, and may further comprise selecting a rank indication (RI) of the channel such that the sum of spectral efficiency over all available code words is maximized, with the a priori knowledge of the PMI. In one embodiment, deriving channel state information from the averaged mutual information further comprises selecting a channel quality indication (CQI) as the maximum achievable spectral efficiency on each code word.

The post-equalization signal-to-interference plus noise ratio (SINR) is computed as a function of the equalizer used for data demodulation. In an embodiment that uses a maximum ratio combining (MRC) equalizer, the post-equalization SINR may be obtained by determining a squared Frobenius norm of the channel matrix. In another embodiment a MIMO minimum mean square error (MMSE) equalizer is used, and the post-equalization SINR may be obtained by computing the channel covariance matrix and deriving therefrom the SINR for each code word. In yet another embodiment where a MIMO maximum likelihood (ML) detection equalizer is used, the post-equalization SINR may be derived from the eigenvalues for the modified channel covariance matrix.

The inventive solution differs from conventional channel state information determining algorithms in that it uses modulation-specific mutual information as a basic metric for CSI computation, in that it estimates time and frequency selective SINR, and handles time-frequency selective fading and interference conditions by averaging in the mutual information domain, rather than in the SINR domain. Also, joint CSI estimation is performed at reasonably low complexity on a sub-sampled data rate (sub-band granularity), and a scalable mutual information metric is used to reflect the actual decoder performance and impact of real channel estimator.

The invention offers a performance advantage when compared to conventional algorithms especially when the post-SINR is highly frequency selective. Also, the invention offers a complexity advantage when compared to alternative exhaustive search algorithms, where RI-CQI-PMI is jointly computed. The method according to the invention is robust to frequency selective, time-varying interference, for time variant downlink power allocation.

BRIEF DESCRIPTION OF THE DRAWINGS

Additional features and advantages of the present invention will be apparent from the following detailed description of specific embodiments which is given by way of example only and in which reference will be made to the accompanying drawings, wherein.

DETAILED DESCRIPTION

Figure 4:
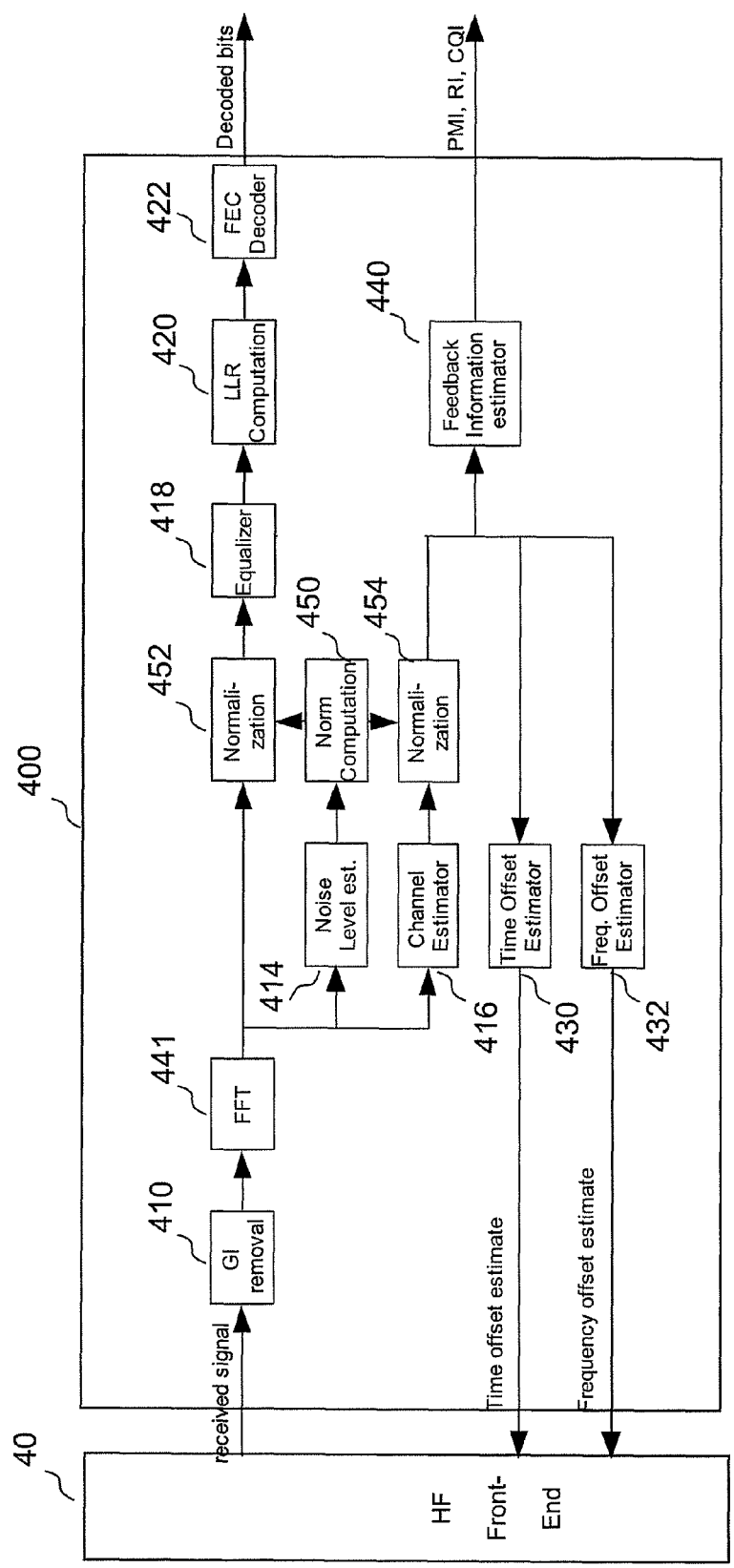
FIG. 4 is a simplified block diagram illustrating an LTE baseband receiver according to one embodiment of the invention.
Figure 5:
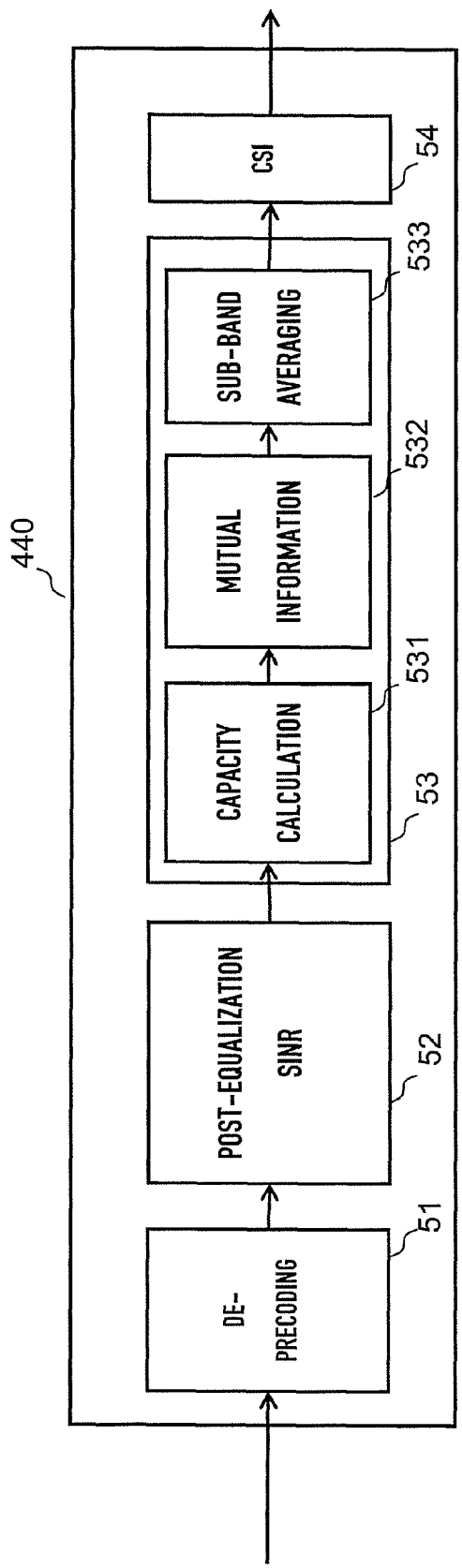
FIG. 5 is a block diagram illustrating the feedback information estimator of [0025]
Figure 6:
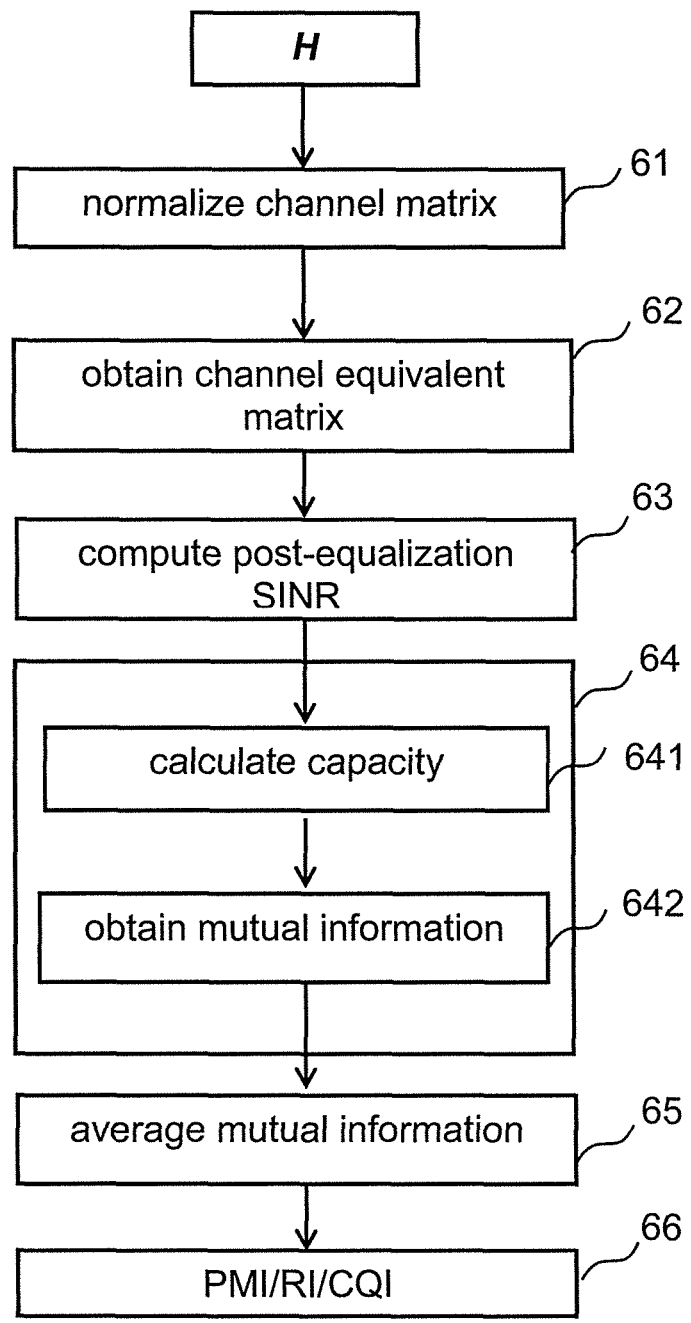
FIG. 6 is a flow chart illustrating the method for determining channel state information according to one embodiment of the invention.

The invention will now be described in detail with reference to FIGS. 4 to 6 wherein FIGS. 4 and 5 illustrate details of an exemplary baseband receiver arrangement according to the invention and FIG. 6 is a flow chart of the inventive method that can be performed in this receiver arrangement. FIG. 4 shows an OFDM baseband receiver 400 according to an exemplary embodiment of the invention. After guard interval (GI) removal at 410, blocks of the signal received from the HF front-end 40 are processed via fast Fourier transform (FFT), at 412, to convert received time domain symbols into the frequency domain. A number of processed FFT blocks form a time-frequency plane consisting of received data symbols and reference symbols. Channel estimation, at 416, and noise level estimation, at 414, is typically performed based on reference symbols.

Data symbols and corresponding channel estimates are equalized, at 418, and then log likelihood values are computed, at 420, and fed into a deinterleaving/decoding unit 422 which obtains decoded data from the equalized and scaled symbols. Data bits output from forward error correcting (FEC) decoder 422 include control bits and payload bits. The OFDM baseband receiver further comprises a channel estimation unit 416 for estimating the channel transfer function, a noise level estimation unit 414 for estimating a composite level of noise and interference, an equalizer unit 418 for equalizing data symbols, an LLR computation unit 420 for computing log likelihood ratios, an FEC decoder 422 for decoding softbits to provide decoded data bits, a time offset estimation unit 430 for time offset estimation, a frequency offset estimation unit for frequency offset estimation 432, and a feedback information estimation unit 440 for feedback information computation. In one embodiment of an OFDM baseband receiver shown in FIG. 4, the noise level estimation unit 414 computes a plurality of noise level estimates, which may generally be different in time and frequency direction. These noise level estimates are used to obtain noise normalization values, at 450, which are applied to both, received data symbols, at 452, and to the computed channel estimates, at

454. Normalized channel estimation data from 454 are fed into the time offset estimator 430 and the frequency offset estimator 432, for determining time and frequency offset estimates, respectively, that are used for time and frequency tracking loops between the digital baseband receiver 400, and the analog RF front-end of an OFDM receiver arrangement as shown at 40.

Normalized channel estimation data from 454 are also fed into the feedback information estimation unit 440. FIG. 5 illustrates one embodiment of feedback information estimator 440 which is implemented by three hardware blocks, namely a de-precoding block 51, a post-equalization SINR block 52, and a mutual information block 53, respectively, and a software block 54 for calculating channel state information (CSI) from the averaged mutual information obtained in block 53. It has to be understood, however, that this particular implementation of hardware and software blocks is merely illustrative, and other combinations of hardware and software blocks that perform the inventive CSI estimating method are within the scope of the invention.

The operation of the feedback information estimation unit 440 will be understood in conjunction with the flow chart of the method steps performed according to the invention as shown in FIG. 6 which is described below.

The frequency selective interference noise covariance matrix is estimated on a resource block (RB) basis. At 61, the reciprocal Cholesky decomposition of the estimated interference is used to weight the channel matrix $$H_n = \tilde{n} \cdot H \qquad (4)$$

wherein the normalization matrix ñ is related to the interference estimate as follows:

$$\Phi_{nn}^{-1} = \tilde{n}^H \cdot \tilde{n} \qquad (5)$$

As a result, the initially colored noise is normalized to unit variance over the overall bandwidth.

As mentioned before with reference to FIG. 4, this normalized channel estimation data are obtained in block 454 and fed into the feedback information estimation unit 440.

In de-precoding block 51 of FIG. 5, for all available precoding matrices $W_i$, the normalized channel matrix is multiplied to provide a channel equivalent matrix, at 62 in FIG. 6:

$$\overline{H}_n^i H_n \cdot W_i \qquad (6)$$

Then, at 63, the post equalization SINR is computed for the actual equalizer in use, in post-equalization SINR block 52 of FIG. 5.

Three exemplary equalization techniques will be detailed below.

In the case of maximum ratio combining (MRC) equalization according to one embodiment, the SINR is computed using the squared Frobenius norm of the channel matrix:

$$SINR_0^i = (\|\overline{H}_n^i\|_2)^2 \qquad (7)$$

In case of MIMO minimum mean square error (MMSE) equalization according to another embodiment, the first the channel covariance matrix is computed:

$$R^i = \overline{H}_n^{i\,H} \overline{H}_n^i \qquad (8)$$

with $$R^i = \begin{pmatrix} r_{11} & r_{12} \\ r_{21} & r_{22} \end{pmatrix} \qquad (9)$$

Then the SINR is derived for each code word:

$$SINR_0^i = r_{11} - \frac{|r_{12}|^2}{r_{22} + \sigma^2} \qquad (10)$$

$$SINR_1^i = r_{22} - \frac{|r_{12}|^2}{r_{11} + \sigma^2} \qquad (11)$$

When using MIMO maximum likelihood (ML) detection in one embodiment, the post-equalization SINR is derived from the eigenvalues for the modified R matrix:

$$\overline{R}^i = \overline{H}_n^{i\,H} \overline{H}_n^i \qquad (12)$$

with $$\overline{R}^i = \begin{pmatrix} r_{11} & |r_{12}| \\ |r_{12}| & r_{22} \end{pmatrix} \qquad (13)$$

$SINR_0^i$ being the $1^{st}$ eigenvalue
$SINR_1^i$ being the $2^{nd}$ eigenvalue.

At 64, the modulation dependent mutual information is derived for each post-equalization $SINR_k^i$ value. Hence, we handle with mutual information for QPSK, 16-QAM, or 64-QAM, for each code word. The modulation dependent mutual information is computed in two steps:

First, at 641 of FIG. 6, the hypothetical capacity is computed for all post-equalization $SINR_k^i$, by a capacity calculation unit 531 which is a part of the mutual information block 53 of FIG. 5:

$$C_k^i = \log 2\left(\frac{\epsilon}{\delta} + SINR_k^i\right) + \log 2(\delta) \qquad (16)$$

Here, the parameter ϵ models the parameter estimation error variance caused by the channel estimation error, and the parameter δ is a downlink power allocation compensation term. δ copes with time varying downlink power allocation in LTE networks.

Then, at 642, a non-linear transform is applied to model the actual modulation type and the receiver specific QAM demapper implementation. This is performed by a mutual information calculation block 532 in FIG. 5. For each modulation m, we have:

$$\tilde{C}_{k,m}^i = f_m(C_k^i) \qquad (17)$$

Figure 1:
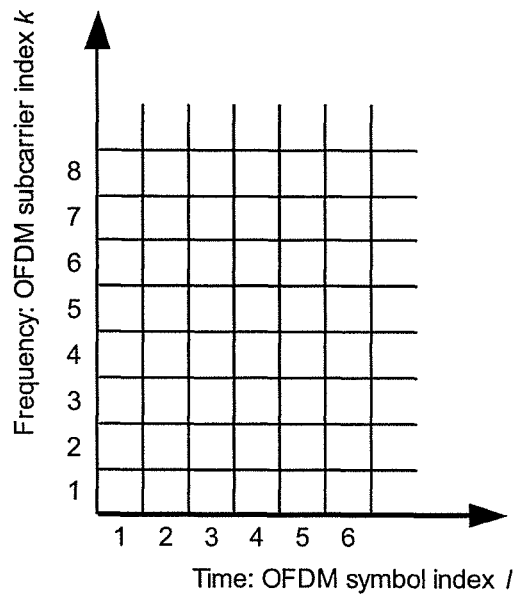
FIG. 1 illustrates a time-frequency plane used in OFDM to define symbols.
Figure 2:
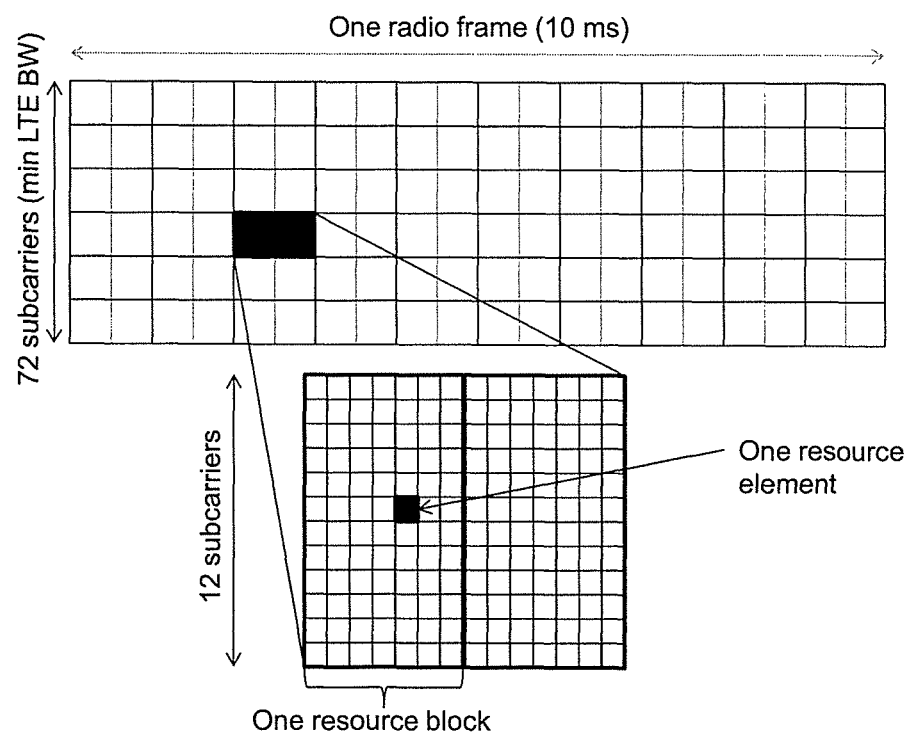
FIG. 2 shows an LTE time-frequency grid.
Figure 3:
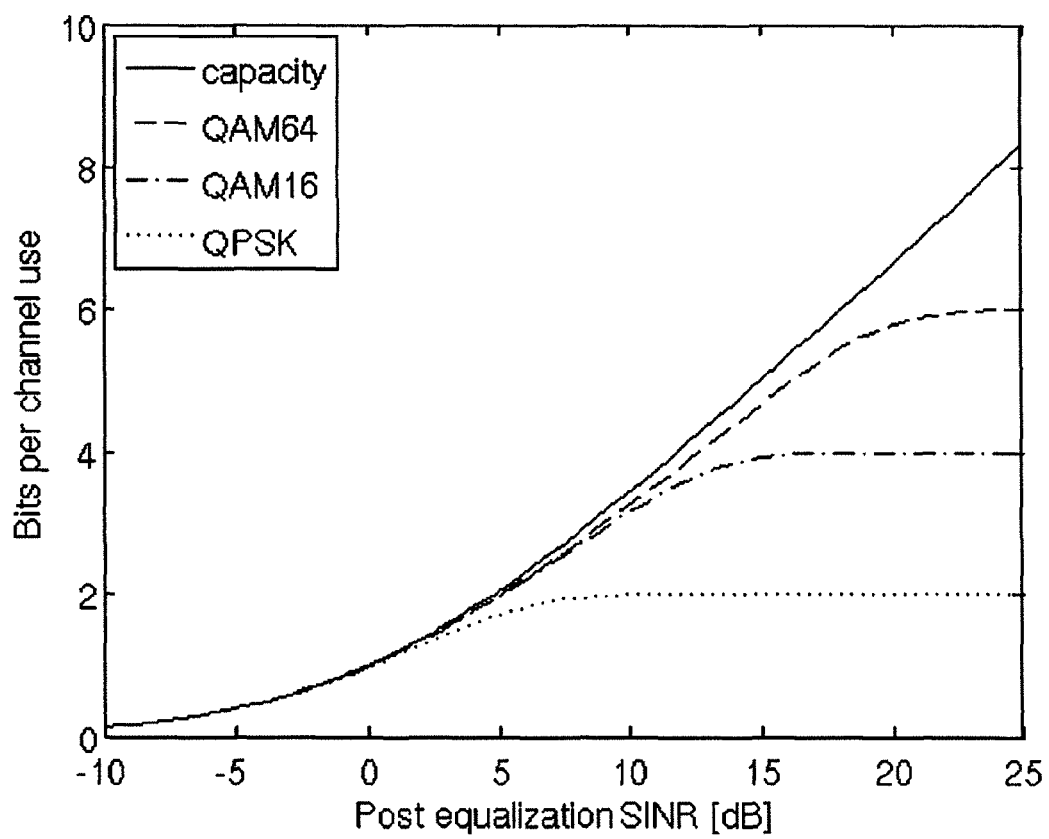
FIG. 3 is a graph illustrating channel capacity and mutual information for different modulation and coding schemes, used in the method of the invention.

The result of the $f_m$ transformation is depicted in FIG. 3. In particular, FIG. 3 shows a graph of the channel capacity and mutual information for different modulation and coding schemes, i.e. QPSK, 16-QAM, and 64-QAM in bits per channel use versus the post-equalization SINR which is obtained at 63 of FIG. 6. A 'channel use', herein, corresponds to the transmission of one resource element as shown in [0023].

At 65, the mutual information $\tilde{C}_{k,m}^i$ is averaged in sub-bands, to operate search algorithms on a low data rate. This can be performed by a sub-band averaging unit 533 as shown in FIG. 5.

Finally, at 66 of FIG. 6 and CSI block 54 of FIG. 5, respectively, a CSI computation is performed, for example, in three steps:

First, the PMI is selected such that it maximizes the sum of spectral efficiency over all code words:

$$PMI_K = \underset{i}{\operatorname{argmax}} \sum_{k}^{K} \underset{m}{\operatorname{argmax}} \varphi(\tilde{C}_{k,m}^{j}) \qquad (18)$$

The non-linear function φ(x) is implemented as a quantization table which maps the estimated mutual information $\tilde{C}_{k,m}$ on available MCS, at a block error rate of 10%. The PMI is thus selected for each possible number of code words k (wherein k varies from 1 to 4).

Then, the rank of the channel is selected such that the sum of spectral efficiency over all available code words is maximized, with the a priori knowledge of the PMI:

$$\operatorname{rank} = \underset{k}{\operatorname{argmax}} \sum_{k}^{K} \underset{m}{\operatorname{argmax}} \varphi(\tilde{C}_{k,m}) \qquad (19)$$

wherein $\tilde{C}_{km}$ is the mutual information corresponding to a selected PMI.

As a last step, the CQI is selected as the maximum achievable spectral efficiency on each code word:

$$CQI_k = \underset{m}{\operatorname{argmax}} \varphi(\tilde{C}_{k,m}). \qquad (20)$$

It has thus been described a high performance, low-complexity CSI computation algorithm which employs mutual information as a basic metric, especially QPSK, 16-QAM, and 64-QAM mutual information metrics. The per-symbol mutual information is combined into sub-bands of adjustable size. A low complexity search algorithm is used to jointly estimate CQI-PMI-RI at a lower data rate, and a time-frequency selective interference estimation is employed for accurate SINR estimation.

Due to the superior performance of frequency selective soft-metric weighting for interference limited environments, receivers have become required to use frequency selective noise estimation. In order to reduce the penalty for noise limited environments, LTE receivers are likely to make use of the invention in the future. As computational complexity is directly related to cost of ownership as well as power consumption, the disclosed architecture is likely to become the method of choice, especially for mobile applications.

The invention claimed is:

1. A method for determining channel state information in an orthogonal frequency division multiplexing (OFDM) transmission scheme in a receiver, comprising:
   estimating a frequency selective interference noise covariance matrix per resource block, wherein a resource block comprises an aggregate of resource elements that are modulation structures that comprise one subcarrier by one symbol;
   obtaining a normalized channel matrix by weighting a channel matrix using the estimated frequency selective interference noise covariance matrix as an interference estimate;
   determining a channel equivalent matrix by multiplying the normalized channel matrix with all available precoding matrices;
   computing a post-equalization signal-to-interference plus noise ratio (SINR) as a function of an equalizer in use in the receiver using the determined channel equivalent matrix;
   deriving mutual information for each post-equalization SINR as a function of the modulation used;
   averaging the mutual information in sub-bands; and
   deriving channel state information from the averaged mutual information.

2. The method of claim 1, wherein deriving the mutual information comprises:
   computing a hypothetical capacity for all computed post-equalization SINR; and
   applying a non-linear transform to the hypothetical capacity, which non-linear transform models an actual modulation type and a receiver specific QAM demapper implementation, to obtain the mutual information for each post-equalization SINR value.

3. The method of claim 1, wherein deriving channel state information from the averaged mutual information comprises:
   selecting a precoding matrix index (PMI) for each possible number of code words such that it maximizes a sum of spectral efficiency over all code words.

4. The method of claim 3, wherein deriving channel state information from the averaged mutual information further comprises:
   selecting a rank indication (RI) of a channel such that the sum of spectral efficiency over all available code words is maximized, with the a priori knowledge of the PMI.

5. The method of claim 3, wherein deriving channel state information from the averaged mutual information further comprises:
   selecting a channel quality indication (COI) as a maximum achievable spectral efficiency on each code word.

6. The method according to claim 1, wherein the equalizer uses maximum ratio combining (MRC), and computing a post-equalization SINR comprises determining a squared Frobenius norm of the channel matrix.

7. The method according to claim 1, wherein the equalizer uses MIMO minimum mean square error (MMSE) equalization, and computing a post-equalization SINR comprises computing the channel covariance matrix and deriving therefrom the SINR for each code word.

8. The method according to claim 1, wherein the equalizer uses MIMO maximum likelihood (ML) detection, and computing a post-equalization SINR comprises deriving the post-equalization SINR from eigenvalues of the modified channel covariance matrix.

9. An orthogonal frequency division multiplexing (OFDM) baseband receiver, comprising:
   a noise level estimation unit configured to estimate a noise level and channel conditions from received symbols;
   a demodulator unit configured to demodulate and decode data comprised of the received symbols,
   an estimation unit configured to estimate time and frequency offset parameters based on the received symbols; and
   a feedback information estimation unit configured to estimate feedback information using the noise level and channel condition estimates, wherein the feedback information estimation unit comprises:
      a de-precoding unit configured to determine a channel equivalent matrix by multiplying a normalized channel matrix with all available precoding matrices;
      a post-equalization SINR unit configured to compute a post-equalization signal-to-interference plus noise ratio (SINR) as a function of an equalizer in use in the receiver;

a mutual information derivation unit configured to derive mutual information for each post-equalization SINR as a function of the modulation used;

an averaging unit configured to average the mutual information in sub-bands; and a channel state information derivation unit configured to derive channel state information from the averaged mutual information.

10. The baseband receiver of claim 9, wherein the mutual information derivation unit comprises a computing unit configured to compute a hypothetical capacity for all code words, and wherein the mutual information derivation unit comprises a mutual information calculation block configured, for each post-equalization SINR, to apply a non-linear transform to the hypothetical capacity, which non-linear transform models an actual modulation rate and the receiver specific QAM demapper implementation.

11. The baseband receiver of claim 9, wherein the channel state information derivation unit is operable to select a precoding matrix index (PMI) for each possible number of code words such that it maximizes a sum of spectral efficiency over all code words.

12. The baseband receiver of claim 11, wherein the channel state information derivation unit is further operable to select a rank indication (RI) of the channel such that the sum of spectral efficiency over all available code words is maximized, with the a priori knowledge of the PMI.

13. The baseband receiver of claim 11, wherein the channel state information derivation unit is further operable to select a channel quality indication (CQI) as the maximum achievable spectral efficiency on each code word.

\* \* \* \* \*

UNITED STATES PATENT AND TRADEMARK OFFICE
CERTIFICATE OF CORRECTION

| | |
|---|---|
| PATENT NO. | : 8,731,038 B2 |
| APPLICATION NO. | : 13/543997 |
| DATED | : May 20, 2014 |
| INVENTOR(S) | : Johan Pean et al. |

It is certified that error appears in the above-identified patent and that said Letters Patent is hereby corrected as shown below:

In the Claim

Column 8, Claim 5, Line 31 replace "...channel quality indication (COI) as a..." with
--...channel quality indication (CQI) as a...--

Signed and Sealed this
Twenty-second Day of July, 2014

Michelle K. Lee
*Deputy Director of the United States Patent and Trademark Office*